(12) United States Patent
Ito et al.

(10) Patent No.: US 8,301,352 B2
(45) Date of Patent: Oct. 30, 2012

(54) TRANSMISSION POWER CONTROL PARAMETER CALCULATION METHOD AND DEVICE

(75) Inventors: Akira Ito, Kawasaki (JP); Takashi Dateki, Kawasaki (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/227,677

(22) Filed: Sep. 8, 2011

(65) Prior Publication Data

US 2011/0320098 A1      Dec. 29, 2011

Related U.S. Application Data

(63) Continuation of application No. PCT/JP2009/001424, filed on Mar. 27, 2009.

(51) Int. Cl.
*G06F 19/00* (2006.01)
(52) U.S. Cl. .......................................... 701/66
(58) Field of Classification Search ............... 701/51, 701/54, 66
See application file for complete search history.

(56) References Cited

U.S. PATENT DOCUMENTS

| | | | |
|---|---|---|---|
| 5,991,262 A | 11/1999 | Laird et al. | |
| 2001/0000456 A1 | 4/2001 | McGowan | |
| 2005/0243895 A1 | 11/2005 | Ashikhmin et al. | |
| 2007/0265757 A1* | 11/2007 | Kawasaki | 701/51 |
| 2008/0076462 A1* | 3/2008 | Iochi et al. | 455/522 |
| 2008/0118001 A1* | 5/2008 | Chan et al. | 375/297 |

FOREIGN PATENT DOCUMENTS

| | | |
|---|---|---|
| JP | A-2004-208051 | 7/2004 |
| JP | B2-3580421 | 7/2004 |
| JP | 2005-318631 | 11/2005 |
| JP | B2-4036903 | 11/2007 |
| WO | 2008/102829 | 8/2008 |
| WO | 2008/123148 | 10/2008 |

OTHER PUBLICATIONS

Motorola; "Implementation Aspects of 16-QAM for HSPA Uplink"; Agenda Item: 7.3; 3GPP TSG RAN1#46-BIS; R1-062469; Seoul, South Korea; Oct. 9-13, 2006.

ZTE, RITT; "Correction on PRACH Sequence Ordering Table"; Agenda Item: 6.1.8; 3GPP TSG RAN WG1 Meeting #52; R1-081044; Sorrento, Italy; Feb. 11-15, 2008.

3GPP TS 25.101 V8.1.0 (2007-12); 3rd Generation Partnership Project; Technical Specification Group Radio Access Network; "User Equipment (Ue) radio transmission and reception (FDD) (Release 8)"; Dec. 2007.

Notice of Rejection Ground issued for corresponding Japanese Patent Application No. 2011-505675 mailed Jul. 3, 2012 with partial English translation.

* cited by examiner

*Primary Examiner* — Kim T Nguyen

(74) *Attorney, Agent, or Firm* — Myers Wolin, LLC

(57) ABSTRACT

A cubic metric calculator performs a calculation of a time average of power of the amplitude of a transmission signal when a cubic metric value is calculated as a product-sum operation between a transmission power-dependent term including an amplitude value depending on the transmission power of a transmission signal and a time average term including only a modulation parameter not depending on the transmission power of the transmission signal. When the transmission signal is transmitted, the operator inputs the amplitude value to calculate the transmission power-dependent term, reads the value of the time average term from coefficient memory, and performs the product-sum operation using an operation result of the transmission power-dependent term and the read value of the time average term, thereby calculating a time average of the power of the amplitude of the transmission signal.

6 Claims, 4 Drawing Sheets

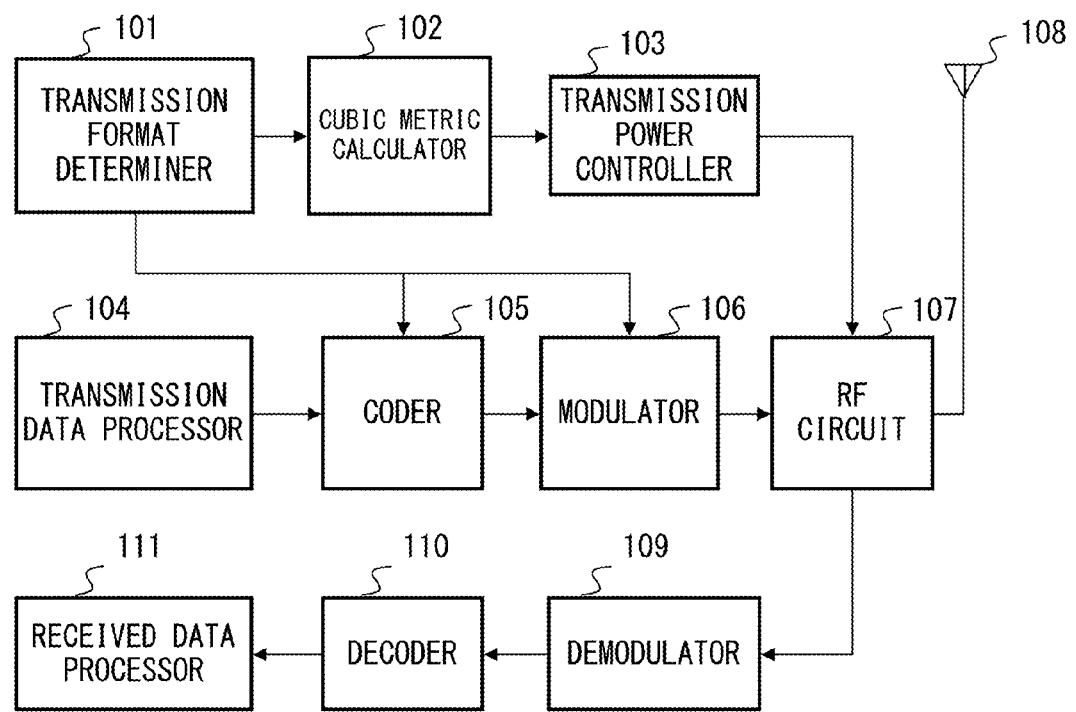
F I G. 1

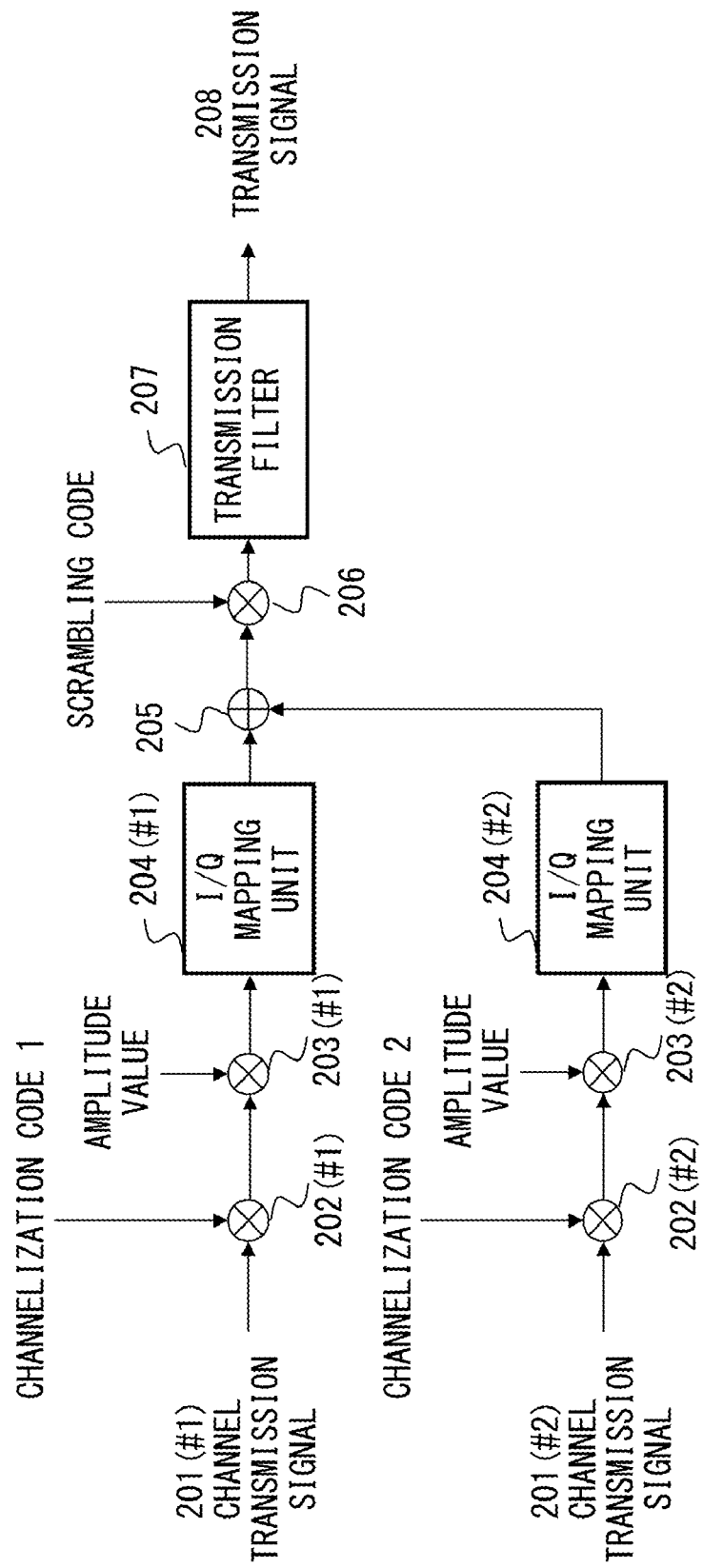
F I G. 2

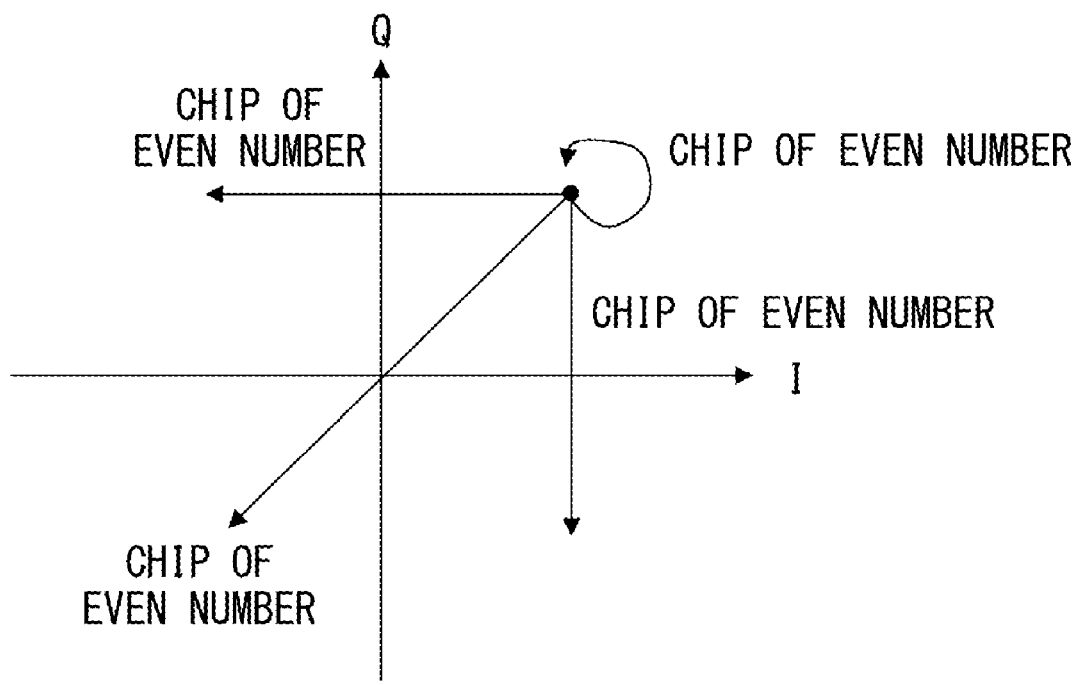
F I G. 3

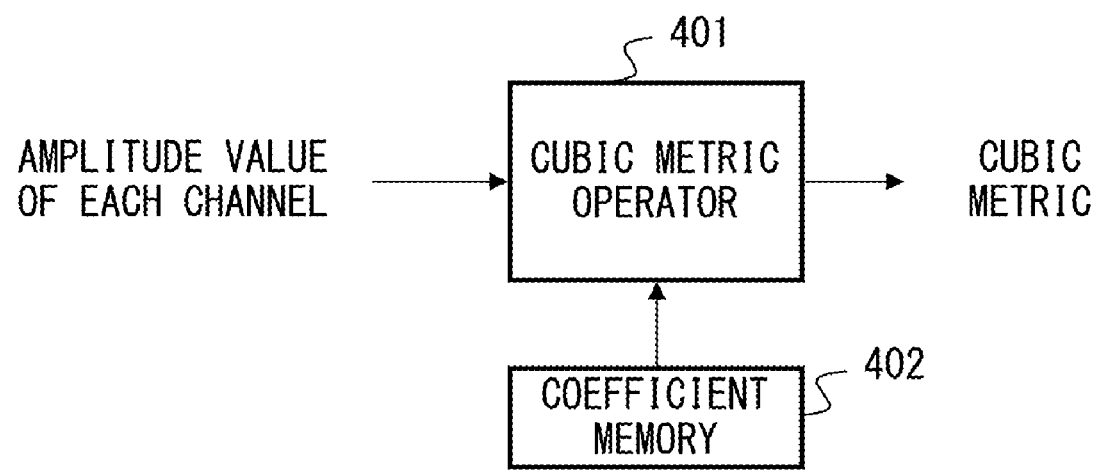
F I G. 4

TRANSMISSION POWER CONTROL PARAMETER CALCULATION METHOD AND DEVICE

CROSS-REFERENCE TO RELATED APPLICATIONS

This application is a continuation of PCT application PCT/JP2009/001424 which was filed on Mar. 27, 2009, the entire contents of which are incorporated herein by reference.

FIELD

The present invention relates to a method and a device for calculating a parameter used in controlling transmission power.

BACKGROUND

In an uplink channel in a cellular radio transmission system, when a transmission is performed by high power around the maximum transmission power in a signal format of a large PAPR (peak to acquire ratio), there occurs a large distortion by a transmission amplifier. As a result, the ACLR (adjacent carrier leakage ratio) to be considered in a radio system cannot be satisfied. To avoid the disadvantage, a device for reducing the maximum transmission power can be implemented in a cellular radio transmission system.

As a standardized radio communication system in a 3GPP (3rd generation partnership project) of an organization of standardization, HSUPA (high speed uplink packet access) radio communication system is well known. The radio communication system is an extended system of WCDMA (wideband code division multiple access) as a third generation mobile telephone radio access system similarly standardized by the 3GPP. In the HSUPA, with an increasing number of multiple codes, a system of reducing the above-mentioned maximum transmission power is implemented. In this case, as the reference quantity for control of the maximum transmission power, the quantity of cubic metric expressed by the following equation is defined.

$$CM = CEIL\{[20*\log 10((v\_norm^3)_{rms}) - 20*\log 10((v\_norm\_ref^3)_{rms})]/k, 0.5\} \quad \text{[equation 1]}$$

In the equation 1, "v_norm" indicates a voltage value of a transmission signal. "rms" indicates a root mean square operation. "k" is a constant depending on the transmission format, and can be 1.85 or 1.56. "v_norm_ref" indicates a voltage value of a waveform of a reference signal of an AMR (adaptive multi-rate codec) of 12.2 kbps, and 20*log 10 (v_norm_ref 3) rms=1.52. The AMR is one of the audio coding systems of the WCDMA standardized by the 3GPP. The CEIL (x, p. 5) indicates a round-up operation in 0.5 units.

In the HSUPA, it is regulated that a terminal can reduce the maximum transmission power depending on the quantity of the CM. The CM is reference quantity required to satisfy the above-mentioned ACLR. The ACLR indicates a definite influence of the third order intermodulation distortion, and the third order intermodulation distortion is proportional to the cube of power. Then, the CM is obtained by the cube of power.

When the standard is adopted, the terminal calculates the maximum transmission power by considering the amount of reduction by the CM after the calculation of the CM, and performs a transmission with the transmission power reduced to the maximum transmission power when the transmission is to be performed with the power exceeding the maximum transmission power.

There is a control system performed without obtaining the CM and without changing the maximum transmission power. However, in this case, the cost of the transmission amplifier increases, and there is a necessity to raise the power allowed by the transmission amplifier.

When a CM operation is performed, it is necessary to obtain a transmission voltage value v_norm when a calculation is directly performed by the definition equation of the equation 1. However, with the configuration of a normal transmitter, a transmission is practically performed immediately after generating a transmission waveform. Therefore, the time to perform power control of the CM cannot be reserved after generating a transmission waveform.

Therefore, a conventional system is devised to first consider that the transmission data in digital communications is arranged at random unless the meaning of data is not taken into account, generate a pseudo-transmission waveform using a random signal while channel encoding (turbo-coding etc.) is being performed, and calculate the CM on the pseudo-transmission waveform.

However, in this conventional technology, a transmitter of a system different from a system for generating a practical transmission waveform is required, thereby doubling the scale of the circuit only for power control.

The following document of the prior art has been disclosed.
Patent Document 1: Japanese Laid-open Patent Publication No. 2004-208051

SUMMARY

According to an aspect of the invention, a method performed by a terminal for calculating a transmission power control parameter by calculating a time average of power of amplitude of a transmission signal to calculate a reference value for control of transmission power of the transmission signal after the multiplexing in a radio transmission system for multiplexing and transmitting a plurality of channel signals, the method comprising: performing a calculation of the time average of power of the amplitude of the transmission signal as a product-sum operation between a transmission power-dependent term including a modulation parameter depending on the transmission power of the transmission signal and a time average term including only a modulation parameter not depending on the transmission power of the transmission signal, and in a transmitting process of the transmission signal, inputting the modulation parameter depending on the transmission power of the transmission signal to calculate the transmission power-dependent term, reading a value of the time average term including only the modulation parameter not depending on the transmission power of the transmission signal stored in advance, and performing the product-sum operation using a result of the calculation of the transmission power-dependent term and a read value of the time average term, thereby performing the time average of power of the amplitude of the transmission signal; and calculating in advance a value of a time average term including only a modulation parameter not dependent on the transmission power of the transmission signal, and storing the value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration of an embodiment of the HSUPA communication processor in a mobile radio communication terminal;

FIG. 2 is a detailed configuration of a modulator 106;

FIG. 3 is an explanatory view of an HPSK; and

FIG. 4 is a configuration of a cubic metric calculator 102.

DESCRIPTION OF EMBODIMENTS

As an example according to the aspect, a calculation device for calculating a time average of power of the amplitude of a transmission signal to calculate the reference value for control of the transmission power of the transmission signal after the multiplexing in a radio transmission system for multiplexing and transmitting a plurality of channel signals, or a radio terminal device loaded with the calculation device includes the following configuration.

An operator performs a calculation of a time average of power of the amplitude of a transmission signal as a product-sum operation between a transmission power-dependent term including a modulation parameter depending on the transmission power of a transmission signal and a time average term including only a modulation parameter not depending on the transmission power of the transmission signal. When the transmission signal is transmitted, the unit inputs the modulation parameter depending on the transmission power of the transmission signal to calculate the transmission power-dependent term, reads the value of the time average term including only the modulation parameter not depending on the transmission power of the transmission signal, and performs a product-sum operation using a result of the calculation of the transmission power-dependent term and a read value of the time average term, thereby performing the time average of power of the amplitude of the transmission signal.

The coefficient memory stores the previously calculated value of the time average term including only the modulation parameter not dependent on the transmission power, and allows the operator to read the stored value of the time average term when the transmission signal is transmitted.

According to the above-mentioned aspect, the computational complexity in the cubic metric can be largely reduced.

BEST MODE FOR CARRYING OUT THE INVENTION

FIG. 1 is a configuration of an embodiment of the HSUPA communication processor in a mobile radio communication terminal (hereafter referred to simply as a "terminal").

In FIG. 1, a transmission format determiner 101 determines the transmission format in an HSUPA radio communication. A cubic metric calculator 102 calculates the cubic metric defined by the equation 1 in the transmission format device by the transmission format determiner 101. The transmission data processor 104 generates transmission data. A coder 105 encodes the transmission data in the transmission format determined by the cubic metric calculator 102, and outputs the transmission code data. A modulator 106 modulates the transmission code data output from the coder 105, and outputs a transmission signal. An RF (radio frequency) circuit 107 converts the transmission signal of a baseband output from the modulator 106 into a transmission signal of a radio frequency band, and transmits the transmission signal of the radio band through an antenna 108.

A transmission power controller 103 controls the transmission power of the transmission signal generated by the RF circuit 107 based on a CM value calculated by the cubic metric calculator 102.

On the other hand, the RF circuit 107 converts a reception control signal for the HSUPA radio communication received through the antenna 108 from a radio frequency band to a baseband, and outputs the reception control signal. A demodulator 109 demodulates the reception control signal of the baseband and outputs reception control code data. A decoder 110 demodulates the reception control code data output by the demodulator 109, and outputs reception control data. A received data processor 111 performs a receiving process on the reception control data output by the decoder 110, and controls the HSUPA radio communication.

FIG. 2 is a detailed configuration of a modulator 106 illustrated in FIG. 1.

The modulator 106 code-multiplexes a plurality of channel transmission signals 201 (#1, #2, etc.), and generates a transmission signal 208 input to a RF circuit 107 in FIG. 1.

To get the transmission signal 208, a filtering process is performed using the transmission filter 207. The transmission filter 207 is regulated by the HSUPA standard, and is a root roll off filter having a roll off rate of 0.22. A signal obtained by normalizing the transmission signal 208 by the size 1 is v_norm in the definition equation of the CM expressed in the equation 1 above.

The code multiplexing is realized by the multiplicator 202 for each channel multiplying each channel transmission signal 201 by a channelization code (a normal code called a Walch code having the value of 1 or −1). On the reception side, the same code as each channelization code on the transmission side is multiplied, and then each multiplication result is averaged, thereby retrieving each channel transmission signal 201 before the multiplexing.

After the output of the multiplicator 202 is further multiplexed by each amplitude value by a multiplicator 203, the multiplication result is mapped by each I/Q mapping unit 204 to an I (inphase) component or a Q (quadrature) component. The I component and the Q component of each channel output from each I/Q mapping unit 204 are added by an adder 205 for each of the I component and the Q component and multiplied by a scrambling code of each of the I component and the Q component by the multiplicator 206. Which channelization code is used for which channel, and which channel is mapped to which component, the I component or the Q component, are specified in advance by the standard. In addition, the scrambling code is specified by a network (base station) when a channel is set up. The transmission signal obtained from the multiplicator 206 is input to the transmission filter 207.

Since the multiplying operation of each amplitude value for each channel in each multiplicator 203 has a different data rate depending on the channel, a signal can be correctly demodulated and decoded by appropriately performing a power adjustment depending on the condition of each channel. Each amplitude value is supplied by the transmission format determiner 101 in FIG. 1.

The multiplying operation of the scrambling code in the multiplicator 206 is performed by the base station to separate the terminals. In the multiplying operation, the multiplication of the system of the complex number determined for each terminal is performed. The multiplication values in this case are 1, i, −1, and −i respectively corresponding to the rotations of 0, 90, 180, and 270 degrees on the complex plane of the IQ.

(The definition of the scrambling code in a practical standard refers to four types, that is, 1+i, −1+i, −1−i, and 1−i, but the rotation on the IQ plane is not constant as viewed from the reception side. Therefore, they can be 1, i, −1, and −i.) By the scrambling code, the HPSK (hybrid phase shift keying) spread modulation system can be realized.

The HPSK is characterized by the scrambling code in the spread modulation system used in the WCDMA and the HSUPA to suppress the PAPR. FIG. 3 is an explanatory view of the HPSK. As illustrated in FIG. 3, the scrambling code with a chip of an even number can be arbitrary four types, that is, 1+i, 1−i, −1+i, and −1−i (rotations of 0, 90, 180, and 270 degrees). However, with a chip of an odd number, there is only the freedom of selecting one of the two patterns shifted by 90 degrees from the scrambling code of the previous chip. Thus, the frequency of the passage near the origin is suppressed, thereby preventing the increase of the PAPR.

The transmission filter 207 in FIG. 2 is a root roll off filter as described above, and the transmission signal 208 is obtained by applying the root roll off filter to each of the I component and the Q component after the multiplication of the scrambling code.

In the embodiment, the transmission signal 208 generated by the code multiplexing in the modulator 106 illustrated in FIG. 1 realized as FIG. 1 is decomposed into the I component and the Q component of the signal before the multiplexing, and the average value of each component is calculated in advance by numerical integration, thereby performing the calculation of the CM.

FIG. 2 is an example of a configuration of the case in which 2 code multiplexing is performed in the modulator 106, but there also can be the case in which the code multiplexing is performed with three or more codes in the modulator 106. In this case, the multiplication of a channelization code and a multiplication of an amplitude value are performed for each channel, and the multiplication results are mapped to one of the I component and the Q component.

Assume that channels x and y are code-multiplexed as an operation example of the CM. Also assume that before the scrambling code is multiplied in the multiplicator 206 in FIG. 2, the channel x is mapped to the I component and the channel y is mapped to the Q component. Furthermore, it is assumed that the amplitude value of the channel x is βx, and the amplitude value of the channel y is βy.

On the presumption above, the values of the I component and the Q component of the transmission signal whose scrambling code has been multiplied in the multiplicator 206 illustrated in FIG. 2 are expressed by the following equations.

$$I = \beta_x \alpha_{xI} + \beta_y \alpha_{yI} \quad \text{[equation 2]}$$

$$Q = \beta_x \alpha_{xQ} + \beta_y \alpha_{yQ} \quad \text{[equation 3]}$$

where $\alpha_{xI}, \alpha_{yI}, \alpha_{xQ}, \alpha_{yQ}$ are the I component and the Q component of the channels x and y in the transmission signal 208 obtained after the data (1 or −1) is multiplied by a spread code (channelization code and scrambling code) and the transmission filter is operated. As compared with the configuration in FIG. 2, the equations 2 and 3 are different in that the multiplication of the amplitude value is performed finally, but the result is the same although the order in the linear operation is different. The fact can be explained using an equation as follows. With the configuration illustrated in FIG. 2, the transmission signal 208 input to the RF circuit 107 in FIG. 1 is expressed by the following equation.

$$\sum_n \omega_n s_n (\beta_x c_{x,n} x_n + i \beta_y c_{y,n} y_n) \quad \text{[equation 4]}$$

where $x_n, y_n$ are the data in the n-th chip respectively of the channels x and y, $c_{x,n}, c_{y,n}$ are the channelization code (real number) in the n-th chip respectively of the channels x and y, and $s_n$ is a scrambling code (complex number) in the n-th chip, $\omega_n$ is a tap coefficient of the transmission filter in the n-th chip. When the equation 4 is transformed, the following equation is obtained.

$$\sum_n \omega_n s_n (\beta_x c_{x,n} x_n + i \beta_y c_{y,n} y_n) = \quad \text{[equation 5]}$$

$$\beta_x \sum_n \omega_n s_n c_{x,n} x_n + i \beta_y \sum_n \omega_n s_n c_{y,n} y_n$$

In the equation 5, the complex number is s only. The equation 2 can be obtained by assigning $\alpha_{xI}$ to the real part, and assigning $\alpha_{xQ}$ to the imaginary part in the $\Sigma_n s_n \omega_n c_{x,n} x_n$. In addition, the equation 3 can be obtained by assigning $\alpha_{yQ}$ to the real part, and assigning $-\alpha_{yI}$ to the imaginary part in the $\Sigma_n s_n \omega_n c_{y,n} y_n$.

Considering the definition equation of the CM by the equation 1 above, "rms" indicates the root mean square. Therefore, in calculating the CM value, the root mean sextuplicate of the amplitude, that is, the root mean cube of the power, is to be obtained. Accordingly, the signal of the I component in the transmission signal 208 is expressed as I, and the signal of the Q component is expressed as Q. Then, the cube of power can be described as follows using the equations 2 and 3.

$$(I^2 + Q^2)^3 = I^6 + 3I^4Q^2 + 3I^2Q^4 + Q^6 \quad \text{[equation 6]}$$

$$= (\beta_x a_{xI} + \beta_y a_{yI})^6 +$$

$$3(\beta_x a_{xI} + \beta_y a_{yI})^4 (\beta_x a_{xQ} + \beta_y a_{yQ})^2 +$$

$$3(\beta_x a_{xI} + \beta_y a_{yI})^2 (\beta_x a_{xQ} + \beta_y a_{yQ})^4 +$$

$$(\beta_x a_{xQ} + \beta_y a_{yQ})^6$$

In calculating the CM value, the time average of the cube of power expressed by the equation 6 is to be obtained. The time average outputs the same result when it is obtained before the addition. Therefore, if the time average of each term in the equation 6 is obtained and then added later, then the total time average in the equation 6 can be obtained. The time average of each term in the equation 6 can be calculated by the following equations 7, 8, 9, and 10, where <> indicates the time average operation.

$$\langle I^6 \rangle = \langle (\beta_x a_{xI} + \beta_y a_{yI})^6 \rangle \quad \text{[equation 7]}$$

$$= \langle \beta_x^6 a_{xI}^6 + 6\beta_x^5 a_{xI}^5 \beta_y a_{yI} + 15\beta_x^4 a_{xI}^4 \beta_y^2 a_{yI}^2 +$$

$$20\beta_x^3 a_{xI}^3 \beta_y^3 a_{yI}^3 + 15\beta_x^2 a_{xI}^2 \beta_y^4 a_{yI}^4 +$$

$$6\beta_x a_{xI} \beta_y^5 a_{yI}^5 + \beta_y^6 a_{yI}^6 \rangle$$

$$= \langle a_{xI}^6 \rangle \beta_x^6 + 15 \langle a_{xI}^4 a_{yI}^2 \rangle \beta_x^4 \beta_y^2 +$$

$$15 + \langle a_{xI}^2 a_{yI}^4 \rangle \beta_x^2 \beta_y^4 + \langle a_{yI}^6 \rangle \beta_y^6$$

-continued $$\langle I^4 Q^2 \rangle = \langle (\beta_x a_{xI} + \beta_y a_{yI})^4 (\beta_x a_{xQ} + \beta_y a_{yQ})^2 \rangle \quad \text{[equation 8]}$$
$$= \langle (\beta_x^4 a_{xI}^4 + 4\beta_x^3 a_{xI}^3 \beta_y a_{yI} + 6\beta_x^2 a_{xI}^2 \beta_y^2 a_{yI}^2 +$$
$$\quad 4\beta_x a_{xI} \beta_y^3 a_{yI}^3 + \beta_y^4 a_{yI}^4)$$
$$\quad (\beta_x^2 a_{xQ}^2 + 2\beta_x a_{xQ} \beta_y a_{yQ} + \beta_y^2 a_{yQ}^2)\rangle$$
$$= \langle a_{xI}^4 a_{xQ}^2 \rangle \beta_x^6 + (6\langle a_{xI}^4 a_{yI}^2 a_{xQ}^2 \rangle +$$
$$\quad 8\langle a_{xI}^3 a_{yI} a_{xQ} a_{yQ} \rangle + \langle a_{xI}^4 a_{yQ}^2 \rangle)\beta_x^4 \beta_y^2 +$$
$$\quad (6\langle a_{xI}^2 a_{yI}^2 a_{yQ}^2 \rangle + 8\langle a_{xI} a_{yI}^3 a_{xQ} a_{yQ} \rangle +$$
$$\quad \langle a_{yI}^4 a_{xQ}^2 \rangle)\beta_x^2 \beta_y^4 + \langle a_{yI}^4 a_{yQ}^2 \rangle \beta_y^6$$

$$\langle I^2 Q^4 \rangle = \langle (\beta_x a_{xI} + \beta_y a_{yI})^2 (\beta_x a_{xQ} + \beta_y a_{yQ})^4 \rangle \quad \text{[equation 9]}$$
$$= \langle (\beta_x^2 a_{xI}^2 + 2\beta_x a_{xI} \beta_y a_{yI} + \beta_y^2 a_{yI}^2)$$
$$\quad (\beta_x^4 a_{xQ}^4 + 4\beta_x^3 a_{xQ}^3 \beta_y a_{yQ} + 6\beta_x^2 a_{xQ}^2 \beta_y^2 a_{yQ}^2 +$$
$$\quad 4\beta_x a_{xQ} \beta_y^3 a_{yQ}^3 + \beta_y^4 a_{yQ}^4)\rangle$$
$$= \langle a_{xI}^2 a_{xQ}^4 \rangle \beta_x^6 + (6\langle a_{xI}^2 a_{xQ}^2 a_{yQ}^2 \rangle +$$
$$\quad 8\langle a_{xI} a_{yI} a_{xQ}^3 a_{yQ} \rangle + \langle a_{yI}^2 a_{xQ}^4 \rangle)\beta_x^4 \beta_y^2 +$$
$$\quad (6\langle a_{yI}^2 a_{xQ}^2 a_{yQ}^2 \rangle + 8\langle a_{xI} a_{yI} a_{xQ} a_{yQ}^3 \rangle +$$
$$\quad \langle a_{xI}^2 a_{yQ}^4 \rangle)\beta_x^2 \beta_y^4 + \langle a_{yI}^2 a_{yQ}^4 \rangle \beta_y^6$$

$$\langle Q^6 \rangle = \langle (\beta_x a_{xQ} + \beta_y a_{yQ})^6 \rangle \quad \text{[equation 10]}$$
$$= \langle \beta_x^6 a_{xQ}^6 + 6\beta_x^5 a_{xQ}^5 \beta_y a_{yQ} + 15\beta_x^4 a_{xQ}^4 \beta_y^2 a_{yQ}^2 +$$
$$\quad 20\beta_x^3 a_{xQ}^3 \beta_y^3 a_{yQ}^3 + 15\beta_x^2 a_{xQ}^2 \beta_y^4 a_{yQ}^4 +$$
$$\quad 6\beta_x a_{xQ} \beta_y^5 a_{yQ}^5 + \beta_y^6 a_{yQ}^6 \rangle$$
$$= \langle a_{xQ}^6 \rangle \beta_x^6 + 15\langle a_{xQ}^4 a_{yQ}^2 \rangle \beta_x^4 \beta_y^2 +$$
$$\quad 15\langle a_{xQ}^2 a_{yQ}^4 \rangle \beta_x^2 \beta_y^4 + \langle a_{yQ}^6 \rangle \beta_y^6$$

In the process of the calculation by the equations 7 through 10, the term including the odd order of a $\alpha_{xI}$, $\alpha_{yI}$, $\alpha_{xQ}$, $\alpha_{yQ}$ is 0 when the time average is obtained from the randomness of α. Therefore, it is omitted except when the restrictions of the HPSK below are applied. From the restrictions of the HPSK, if $\alpha_{xI} \alpha_{yI} \alpha_{xQ} \alpha_{yQ}$ is included in < >, the average value of the portion is not 0. Therefore, only the time average term including one primary term and including the odd order term of $\alpha_{xI}$, $\alpha_{yI}$, $\alpha_{xQ}$, $\alpha_{yQ}$ is omitted by considering that the average value is 0. That is, for the effect of the HPSK, a $\alpha_{xI}$, $\alpha_{yI}$, $\alpha_{xQ}$, $\alpha_{yQ}$ is not completely independent although the multiplication of random values is performed. By the influences of the descriptions above, the CM value is smaller as compared with the case in which $\alpha_{xI}$, $\alpha_{yI}$, $\alpha_{xQ}$, $\alpha_{yQ}$ is completely independent.

However, the method of omitting the term indicating the time average of 0 is used to reduce the computational complexity of the numerical integration or enhance the accuracy. Therefore, although the calculation is performed without the omission in the practical numerical integration, a similar result can be obtained if the integration is performed for a sufficiently long time To obtain a CM value, the calculation can be performed by the equations 7 through 10 above. That is, if the time average term < > is calculated in advance, the CM value can be calculated by the multiplication between the power of each amplitude value assigned by the transmission format determiner 101 illustrated in FIG. 1 to each of the multiplicators 202 and 203 illustrated in FIG. 2, that is, $\beta_x^6$, $\beta_x^4 \beta_y^2$, $\beta_x^2 \beta_y^4$, $\beta_y^6$, and the time average term < > as a constant calculated in advance, and the addition of the multiplication results.

The problem is that the contents of the time average term < > are to be calculated. However, practically, the following calculation is performed by the operation expression of the right side of the equation 5. The following calculation is performed as a preliminary calculation before the shipment from a factory etc.

First, the data value of each of the channels x and y is determined by generating random numbers. The data value is 1 or −1.

Next, each of the data values is multiplied by each channelization code for each channel depending on the transmission format determined by the transmission format determiner 101 in FIG. 1. As each channelization code, a code determined for each transmission format according to the standard of the HPSK is used.

Next, the multiplication result of each of the channelization codes is mapped to the I component or the Q component. Which channel is to be mapped to which component is determined by the standard.

Then, the mapping result is multiplied by a scrambling code. The scrambling code corresponds to the process of rotating allocated data by 0, 90, 180, and 270 degrees on the complex plane. By the restrictions of the HPSK above, the scrambling code of the chip of an even number is assigned the reduced freedom into two options, that is, +90 degrees and −90 degrees from the previous chip. Therefore, using random numbers, four patterns are generated with 0, 90, 180, and 270 degrees when it is a chip of an even number, and two patterns are generated when it is a chip of an odd number. Thus, the multiplication of the scrambling code can be realized.

A root roll off filter is applied to the data of each chip generated as described above. In the filtering process, for example, a quadruple oversampling is performed so that a sufficiently smooth waveform can be generated.

Then by obtaining an average value for a sufficiently long time for the data sequence generated as described above, the value of each time average term < > of the equations 7 through 10 is calculated.

The calculation result of the value of each time average term < > of the equations 7 through 10 obtained as described above is stored in the memory, thereby removing the necessity to calculate the value each time. Since the number of transmission formats determined by the transmission format determiner 101 is limited by the standard, the memory requirement is not very large with the configuration above.

Based on the preliminary calculating process on the time average term, the cubic metric calculator 102 illustrated in FIG. 1 can be realized by a very simple circuit illustrated in FIG. 4.

In FIG. 4, a coefficient memory 402 stores for each transmission format a value of each time average term < > of the equations 7 through 10 calculated in advance in the process above.

A cubic metric operator 401 inputs an amplitude value of a transmission format provided from the transmission format determiner 101 illustrated in FIG. 1 and each channel transmission signal.

Next, the cubic metric operator 401 reads from the coefficient memory 402 the value of each time average term < > of the equations 7 through 10 corresponding to the provided transmission format.

Furthermore, the cubic metric operator 401 calculates the power term of the provided amplitude value. In the example of the two above-mentioned channels x and y, the following four types of power terms are calculated.

$$\beta_x^6, \beta_x^4 \beta_y^2, \beta_x^2 \beta_y^4, \beta_y^6$$

Then, the cubic metric operator 401 performs the calculation by the equations 7 through 10 above based on the value of each power term and the value of each time average term < > read from the coefficient memory 402, and calculates the CM value based on the equation 1 above using the calculation result.

The explanation above refers to an example of the channel transmission signal 201 having two channels illustrated in FIG. 2, but the CM value can be calculated with the same concept when the number of multiplex is further increased.

In the process of generating a transmission waveform, only the amplitude value of each channel transmission signal is determined immediately before the generating process, that is, the channelization code, the scrambling code, the I/Q mapping, the transmission filter, etc. are obtained in advance. That is, the amplitude value is a modulation parameter depending on the transmission power of the transmission signal, and the channelization code, the scrambling code, the I/Q mapping, the transmission filter, etc. are modulation parameters not dependent on the transmission power of a transmission signal. In addition, the operation for generating a transmission waveform is all linear operation. Therefore, the same operation result can be obtained when the order of each operation term is changed. In the embodiments above, the conditions described above are taken into account by regarding the data of each channel as a random number, and the operating process of the channelization code, the scrambling code, the I/Q mapping, and the transmission filter is performed in advance on the value of the random number. That is, the value of the time average term including only the modulation parameter not dependent on the transmission power of a transmission signal is calculated in advance. Then, each operation result is stored in the coefficient memory 402. When a practical transmitting process is performed, only the power term of the amplitude value of each channel transmission signal, that is, a transmission power-dependent term, is calculated in real time, and a product-sum operation is performed on the calculation result and the time average term stored in the coefficient memory 402, thereby calculating the CM value. Thus, the computational complexity of the CM value can be successfully reduced in the embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method performed by a terminal for calculating a transmission power control parameter by calculating a time average of power of amplitude of a transmission signal to calculate a reference value for control of transmission power of the transmission signal after multiplexing in a radio transmission system for multiplexing and transmitting a plurality of channel signals, the method comprising:

performing a calculation of the time average of power of the amplitude of the transmission signal as a product-sum operation between a transmission power-dependent term including a modulation parameter depending on the transmission power of the transmission signal and a time average term including only a modulation parameter not depending on the transmission power of the transmission signal, and in a transmitting process of the transmission signal, inputting the modulation parameter depending on the transmission power of the transmission signal to calculate the transmission power-dependent term, reading a value of the time average term including only the modulation parameter not depending on the transmission power of the transmission signal stored in advance, and performing the product-sum operation using a result of the calculation of the transmission power-dependent term and the read value of the time average term, thereby performing the time average of power of the amplitude of the transmission signal; and calculating in advance a value of a time average term including only the modulation parameter not dependent on the transmission power of the transmission signal, and storing the value.

2. The method according to claim 1, wherein the reference value is a cubic metric value.

3. The method according to claim 1, wherein the transmission signal is processed as a complex signal, and the transmission power-dependent term and the time average term is separated into a real part and an imaginary part of the complex signal and processed in the product-sum operation.

4. The method according to claim 1, further comprising: performing a multiplex transmitting process on the plurality of channel signals provided by random numbers, thereby calculating the value of the time average term including only the modulation parameter not dependent on the transmission power of the transmission signal.

5. A calculation device which calculates a transmission power control parameter by calculating a time average of power of amplitude of a transmission signal to calculate a reference value for control of transmission power of the transmission signal after multiplexing in a radio transmission system for multiplexing and transmitting a plurality of channel signals, the calculation device comprising:

an operator performing a calculation of the time average of power of the amplitude of the transmission signal as a product-sum operation between a transmission power-dependent term including a modulation parameter depending on the transmission power of the transmission signal and a time average term including only a modulation parameter not depending on the transmission power of the transmission signal, and in a transmitting process of the transmission signal, inputting the modulation parameter depending on the transmission power of the transmission signal to calculate the transmission power-dependent term, reading a value of the time average term including only the modulation parameter not depending on the transmission power of the transmission signal, and performing the product-sum operation using a result of the calculation of the transmission power-dependent term and the read value of the time average term, thereby performing the time average of power of the amplitude of the transmission signal; and a coefficient memory storing a value of a time average term including only the modulation parameter not dependent on the transmission power of the transmission signal, and allowing the operator to read the stored value of the time average term when the transmission signal is transmitted.

6. A radio terminal device loaded with the calculation device of the transmission power control parameter according to claim 5.

* * * * *